United States Patent [19]

Schneider

[11] 4,453,413

[45] Jun. 12, 1984

[54] AERODYNAMIC LOAD DISTRIBUTION SIMULATOR

[76] Inventor: Robert L. Schneider, 15 W. Whittier Ave., Fairborn, Ohio 45324

[21] Appl. No.: 398,130

[22] Filed: Jul. 14, 1982

[51] Int. Cl.³ .................................. G01M 5/00
[52] U.S. Cl. ............................. 73/802; 73/856
[58] Field of Search ........... 73/802, 856, 826, 432 SD

[56] References Cited

U.S. PATENT DOCUMENTS

| | | | |
|---|---|---|---|
| 2,151,584 | 3/1939 | Bugatti | 73/802 |
| 2,319,675 | 5/1943 | Grinter | 73/802 |
| 2,340,505 | 2/1944 | Beed | 73/802 |
| 2,413,737 | 1/1947 | Weaver | 73/802 |
| 2,452,058 | 10/1948 | Kemmer et al. | 73/802 |
| 2,647,399 | 8/1953 | Newbill, Jr. | 73/802 |
| 2,773,482 | 12/1956 | Dickie | 121/748 |
| 3,048,033 | 8/1962 | Melzer | 73/802 |

*Primary Examiner*—Anthony V. Ciarlante
*Attorney, Agent, or Firm*—Donald J. Singer; Bobby D. Scearce

[57] ABSTRACT

A novel test fixture for simulating aerodynamic loading on an airfoil is described which comprises a pair of arrays of a plurality of individual pressure controlled flexible bellows supported between a pair of platens, one array configured to contact and conform to the upper surface of the airfoil and simulate the partial vacuum distribution thereacross, the second array configured to contact and conform to the lower surface of the airfoil and simulate the pressure distribution thereacross. A compliant stabilization structure configured to provide lateral stability to the bellows arrays under pressure conditions is described.

28 Claims, 13 Drawing Figures

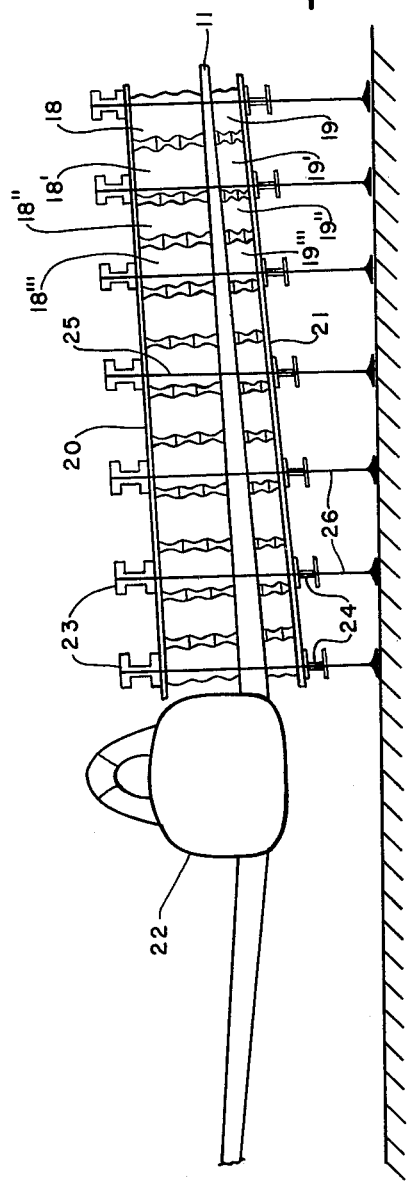
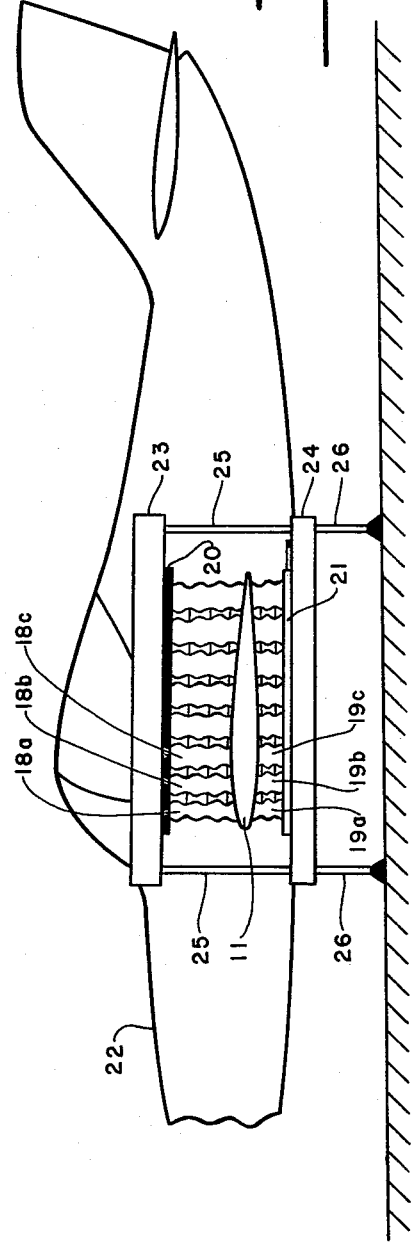

AERODYNAMIC LOAD DISTRIBUTION SIMULATOR

RIGHTS OF THE GOVERNMENT

The invention described herein may be manufactured and used by or for the Government of the United State for all governmental purposes without the payment of any royalty.

BACKGROUND OF THE INVENTION

This invention relates generally to the field of systems configured to simulate aerodynamic pressure loadings on airfoils, and more particularly to a novel bellows array structure configured to simulate the aerodyhnamic loading.

The present invention provides a new and improved method and apparatus for simulating aerodynamic load distributions over the surface of an airfoil, such as an airplane wing or the like, and is useful for the structural testing of aircraft. Simulation of inertial loadings experienced by the airfoil may also be easily accommodated. The apparatus of the present invention comprises a matrix array of bellows-type pressure cells in contact with the airfoil surfaces. The internal pressures (positive pressure or partial vacuum) of each cell may be individually computer controlled through a Scani valve sensing arrangement to provide the desired simulated aerodynamic load distributions over substantially the entire airfoil surface area. The bellows matrix arrangement may be sized and configured to conform to substantially any surface contour to be tested.

The simulated aerodynamic loading apparatus of the present invention enjoys certain significant advantages over previously known devices. In particular, the novel apparatus herein described can be configured to include a variable loading support structure in order to follow large airfoil deflections, or the bellows matrix arrangement may be supported by a fixed structure for simulation testing involving small deflections of the airfoil. The stabilization network providing lateral support to each of the plurality of bellows in the matrix array allows conformance of the apparatus to airfoil surface contours and, in addition, provides the necessary lateral stability to each bellows under pressure. The invention herein is therefore particularly useful in testing variable surface contour airfoil designs. Testing inaccuracies due to approximations characteristically made in the use of certain previously known systems utilizing tension pads or point loading are substantially eliminated through the use of the apparatus described herein. Further, the apparatus of this invention is characterized by relative ease and speed with which it can be assembled for a testing program and subsequently disassembled at program end, as compared to existing systems. The "tension patch" system currently conventionally used can create undesirable localized skin stresses which may be unacceptable in the testing of modern, thin skinned, bonded and composite surfaces. The present invention substantially eliminates or reduces in critical importance the foregoing problems with existing systems.

It is, therefore, an object of the present invention to provide an improved system for simulating the aerodynamic loading distribution on an airfoil.

It is a further object of the present invention to provide an aerodynamic load simulation apparatus conformable to substantially any airfoil surface contour.

It is yet another object of the present invention to provide an improved method for testing airfoil structures under conditions of simulated aerodynamic loading.

These and other objects of the present invention will become apparent as the detailed description of representative embodiments thereof proceeds.

SUMMARY OF THE INVENTION

In accordance with the foregoing principles and objects of the present invention, a novel test fixture for simulating aerodynamic loading on an airfoil is described which comprises a pair of arrays of a plurality of individual pressure controlld flexible bellows supported between a pair of platens, one array configured to contact and conform to the upper surface of the airfoil and simulate the partial vacuum distribution thereacross, the second array configured to contact and conform to the lower surface of the airfoil and simulate the pressure distribution thereacross. A compliant stabilization structure configured to provide lateral stability to the bellows arrays under pressure conditions is described.

DESCRIPTION OF THE DRAWINGS

The present invention will be more clearly understood from the following detailed description of representative embodiments thereof read in conjunction with the accompanying drawings wherein:

FIGS. 4a and 4b are schematic fragmentary front and side elevational views, respectively, of an aircraft with a wing thereof within a test fixture of the present invention.

DETAILED DESCRIPTION

Figure 1:
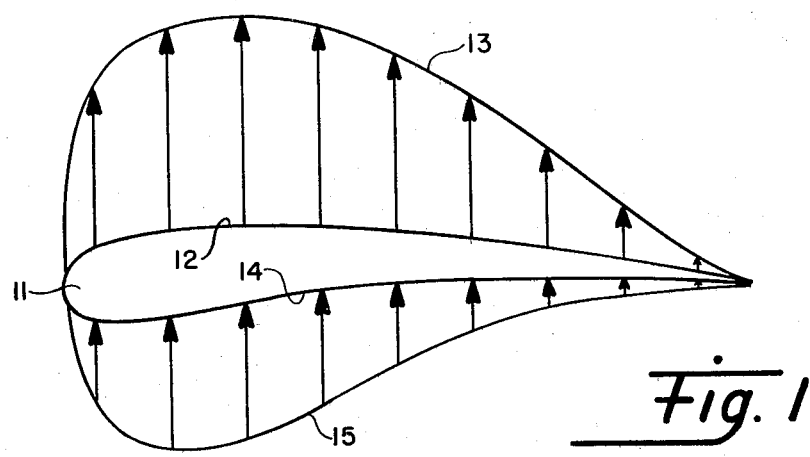
FIG. 1 is a graphic representation of the aerodynamic load distribution over the surface of an airfoil.

The air load distribution across the width of an airfoil may be represented by the curves shown in FIG. 1. As shown therein, an airfoil, in the form of wing 11, under aerodynamic conditions, will experience a partial vacuum across the upper surface 12 thereof, the magnitude and distribution of which may be represented by the curvilinear envelope 12. At the same time, the lower surface 14 of wing 11 will experience a positive pressure distribution similar to that approximated by envelope 15. For a typical wing 11, the upper surface 13 will experience a maximum partial vacuum of about −10 psi, and the lower surface 14 will experience a maximum pressure of about 8 psi, the sum of the two air load distribution curves 13 and 15 providing a measure of the lift experienced by wing 11 under aerodynamic loading.

Figure 2:
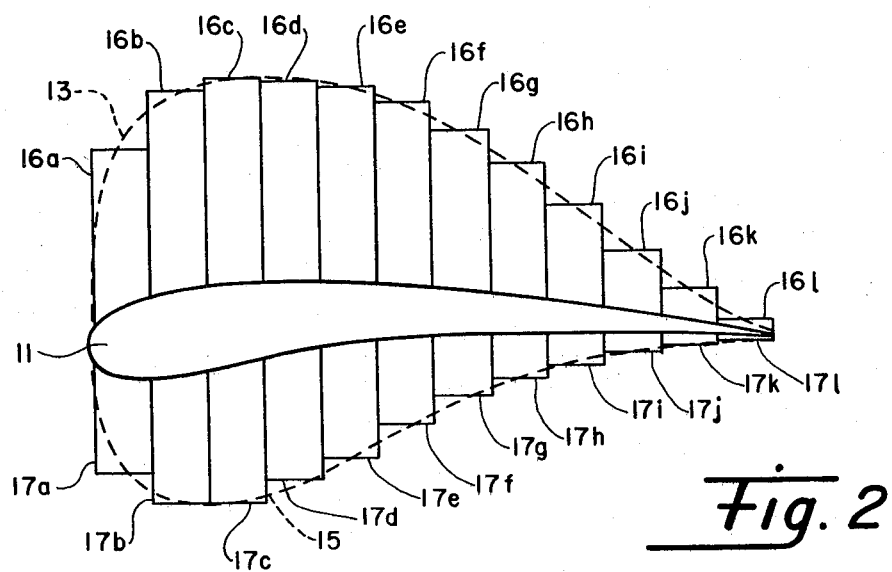
FIG. 2 shows the load distribution curves of FIG. 1 approximated by discrete increments of constant pressure.

As shown in FIG. 2, the pressure distribution curves characteristic of an aerodynamically loaded wing 11 as shown by envelopes 13 and 15 may, to a very good approximation, be represented by discrete increments of constant pressure. Therefore, increments such as 16 $a$–$l$, may closely approximate the partial vacuum envelope 13, and increments such as 17 $a$–$l$ may closely approximate positive pressure envelope 15. The heights of each increment 16 $a$–$l$ and 17 $a$–$l$ represent the total pressure (positive or negative) applied over that respective part of wing 11 in approximating the envelopes 13 and 15.

Figure 3:
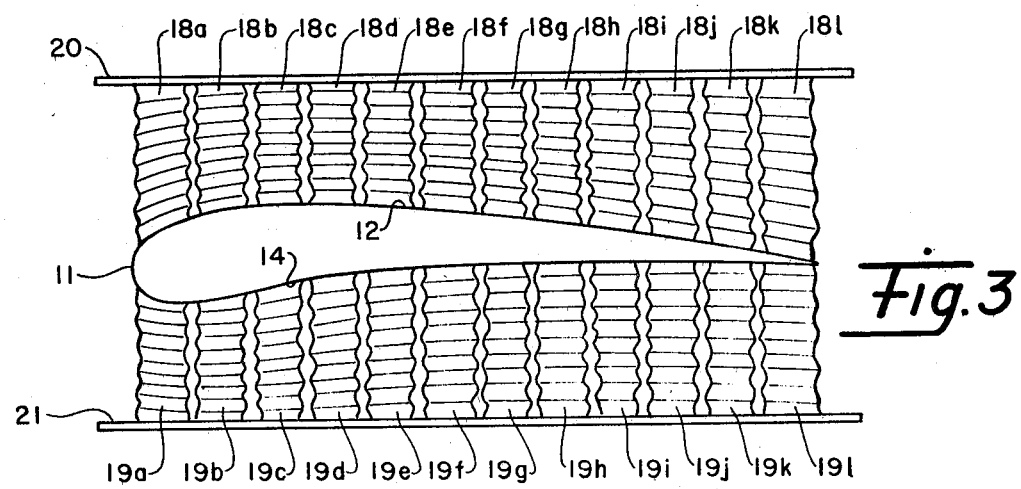
FIG. 3 is a schematic cross section of the airfoil illustrating the application of a bellows matrix array to approximate the pressure increments shown in FIG. 2.

Simulation of the increments 16 $a$–$l$ and 17 $a$–$l$ may then be accomplished using a plurality of individually controlled expansible volume elements such as that defined by an array of longitudinally expansible bellows. A plurality of bellows may be assembled in a matrix array form to cover the upper and lower surfaces of a wing in a manner such as represented schematically in FIGS. 3, 4a, 4b, and 5. As shown in FIG. 3, the aerodynamic load profile over the wing 11 surface from leading edge 11a to trailing edge 11b may be imposed pneumatically by bellows 18 $a$–$l$ in which may be maintained the negative (partial vacuum) pressures 16 $a$–$l$ characteristic of the profile 13 across the upper surface 12 of the wing 11, and by bellows 19 $a$–$l$ in which are maintained the positive pressures 17 $a$–$l$ characteristic of the profile 15 across the lower surface 14. The bellows matrix arrays 18 and 19 may be held between upper backing platen 20 and lower backing platen 21 containing the means (not shown) for providing the desired pneumatic pressures to the individual bellows from separate pressure (or vacuum) sources (also not shown). It is understood that hydraulic pressure means may be utilized in certain applications of the invention herein, or in certain alternative embodiments hereof, for applying positive pressures to the bellows arrays. Platens 20 and 21 may be fixed for small (0-3) deflections of the tip of wing 11 (up or down), or may be controllably movable vertically for larger deflections (greater than about 3 feet), as hereinafter discussed.

As shown in FIGS. 4a and 4b, wing 11 of aircraft 22 may be loaded between an upper bellows array 18 (partial vacuum side) and array 19 (pressure side). As indicated in FIG. 4a, the bellows array 18 comprises a desired number of adjacent rows of bellows 18, 18′, 18″, etc., from tip to root of wing 11, and as shown in FIG. 4b, each row contains adjacent bellows elements a, b, c, etc., from the leading edge 11a to the trailing edge 11b of wing 11, thereby covering substantially all the upper surface area 12 of wing 11 (or any desirable portion thereof). In similar fashion the pressure side bellows array 18, 19′, 19″, etc., is disposed over the lower surface 14 of wing 11. The test configuration of FIGS. 4a and 4b is intended for effecting small wing tip deflections for wing 11 under load. Consistent therewith, the bellows arrays 18, 19 are constrained between platens 20, 21 which are rigidly secured, preferably in a spaced, substantially parallel relationship, to a stationary structure comprising stationary upper beams 23 and stationary lower beams 24 held in spaced relationship by upright spacers 25, the entire structure supported on columns 26. The platens 20, 21 may be of sufficient size to include therebetween all or any desirable portion of wing 11. The amount of deflection of wing 11 (vertical deflection of tip) obtainable using the fixed test configuration of FIGS. 4a and 4b is dependent on the limits of expansion (or compression) of the bellows elements comprising arrays 18, 19 as hereinafter described. Deflections (from the normal or neutral rest position of wing 11) of the tip of wing 11 in the range from about 1.5 feet downward to about 2 feet upward could be accommodated. It is understood, however, that the teachings of the present invention shall not be so limited.

Figure 5:
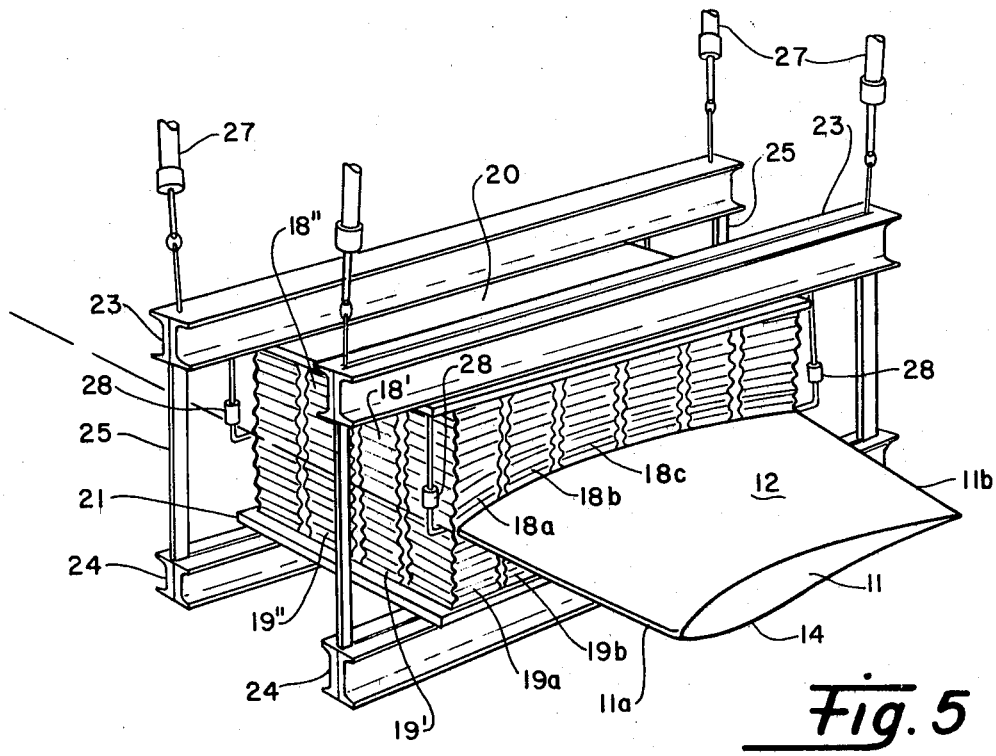
FIG. 5 is a fragmentary perspective view of an aircraft wing within a movable test fixture of the present invention.

For testing of a wing 11 involving loads effecting large wing tip deflections (about 15 feet), the test fixture, as shown schematically in FIG. 5, may be used. As shown therein, the structure comprising beams 23, 24 and spacers 25 may be movably supported by struts 27, attached to external means (not shown) for vertically moving the entire structure including bellows arrays 18, 19 with wing 11 therebetween. The external means, such as large hydraulically actuated rams, may apply the desired force to effect gross wing 11 deflections. This allows the bellows arrays 18, 19 to apply the desired load distribution without large bellows extensions, thereby precluding the need to include large amplitude bellows and simplifying the construction of the test structure. The positions of the leading edge 11a and trailing edge 11b of wing 11 relative to the structure supporting the bellows arrays is sensed by a plurality of deflection transducers 28 disposed conveniently between wing 11 and the support structure, such as between wing 11 and beams 23 as shown in FIG. 5. The external rams are position controlled only, and are intended to provide gross deflection of wing 11; therefore programming of the ram controls and integration thereof with the bellows pressure controls ordinarily would not be needed, although the same could be included in an alternative embodiment hereof. Wing 11 tip deflections of about −10 feet (downward) to about +15 feet (upward) may therefore be accommodated in the configuration represented by FIG. 5.

Figure 6:
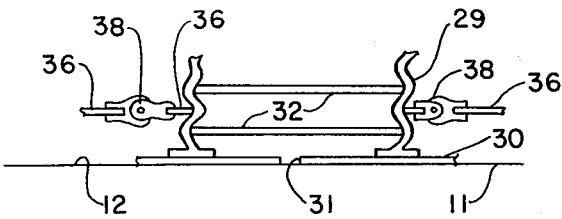
FIG. 6 is a fragmentary cross-sectional view showing details of a bellows construction and attachment to an airfoil for partial vacuum operation.
Figure 10:
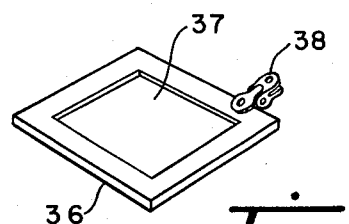
FIG. 10 is a perspective view of a representation individual stabilization ring used in the network of FIG. 8.
Figure 7:
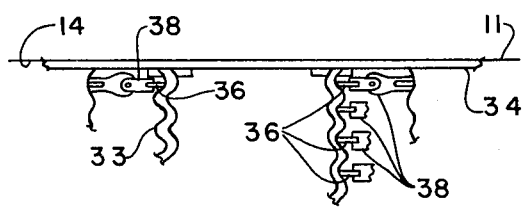
FIG. 7 is a fragmentary cross-sectional view showing details of a bellows construction and attachment to an airfoil for pressure operation.
Figure 9:
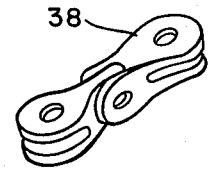
FIG. 9 is a perspective view of a hinged connector useful in interconnecting the stabilization network of FIG. 8.
Figure 11:
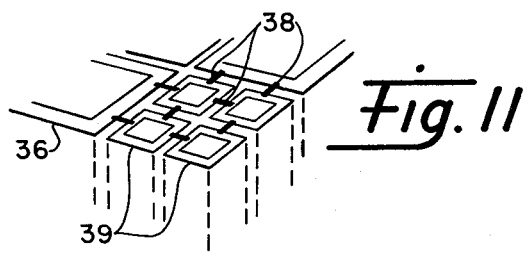
FIG. 11 illustrates a configuration incorporating smaller stabilization rings and bellows.

The structure of the bellows arrays 18, 19 and the stabilization network providing lateral support and continuity to each array may be that shown schematically in FIGS. 6–11. The construction of individual bellows elements, such as 18a included in the partial vacuum array 18, is shown schematically in cross section in the fragmentary view of FIG. 6. Similarly, the individual bellows element of which positive pressure bellows array 19 is comprised is shown in FIG. 7. Each bellows array 18 element therefore may comprise an elongate, reinforced rubber bellows 29 of substantially square cross section and which is molded, cemented or otherwise bonded at one open end thereof to a sheet of resilient material such as reinforced rubber sheet 30 configured to cover and conform to the surface 12 of wing 11 substantially as shown. Because bellows array 18 is intended to operate at reduced pressure (partial vacuum) against the upper surface 12 of wing 11, rubber sheet 30 is provided with an array of holes 31, each registering with an adjacent end of a bellows 29, to ensure good partial vacuum-induced adherence of bellows array 18 to surface 12 of wing 11. The array of holes 31 in rubber sheet 30 may be more vividly exemplified in FIG. 12 the discussion of which follows below. Each bellows 29 has a plurality of square stabilization rings 32 (of similar configuration to that of ring 36 as shown in FIG. 10) spaced coaxially along the interior thereof to provide structural stability to each bellows 29 and to prevent collapse under an imposed partial vacuum therein. As shown in FIG. 7, each bellows element of bellows array 19 comprises a reinforced rubber bellows 33 attached to a second rubber sheet 34 configured to cover and confrom to the lower surface 14 of wing 11. Because bellows array 19 is intended to function at positive pressure, internal stabilization rings to prevent collapse are not required for bellows elements 33.

With proper selection of flexible materials comprising the bellows elements 29, 33, such as the reinforced rubber selected for use herein, each bellows element should withstand any pneumatic pressures anticipated in simulation of aerodynamic loading on wing 11, such as the range of from about $-10$ psig (partial vacuum) to about 10 psig pressure.

Figure 8:
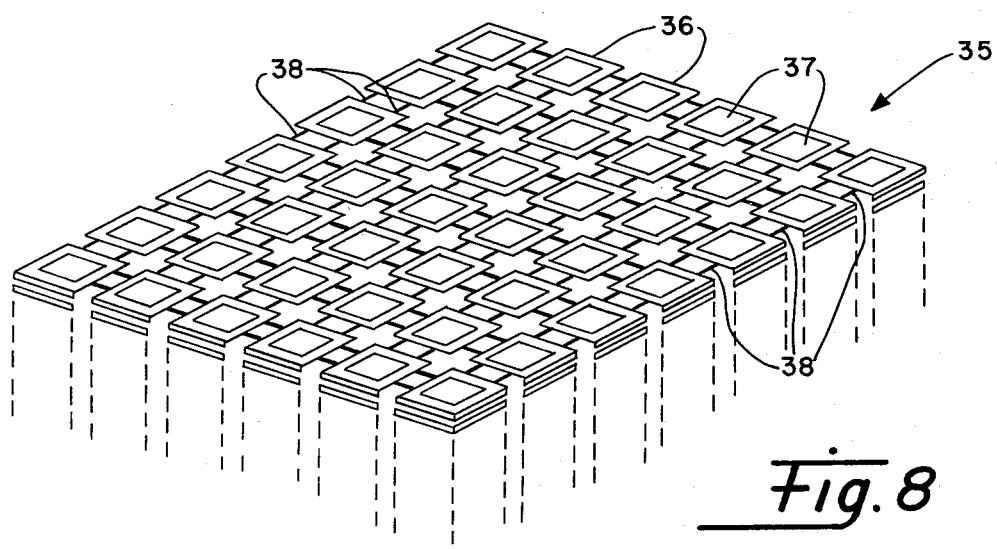
FIG. 8 is a schematic of a stabilization network for providing lateral support to the bellows arrays.

Lateral support for the individual bellows elements 29, 33 in either the pressurized array 19 or the evacuated array 18 is provided by a stacked array 35 of hingedly interconnected square rings 36, each defining a central square opening 37 (see FIG. 10) for receiving a bellows element 29 or 33. Each ring 36 is connected to its adjacent rings through a plurality of hinged connectors 38, the configurations of a ring 36 and connector 38 being shown in detail in FIGS. 9 and 10, to form a planar array of the desired size to accommodate the width and length of the bellows arrays 18, 19. A plurality of ring 36 arrays in a spaced layered relationship as suggested in FIG. 8 is assembled with each set of corresponding openings 37 receiving a bellows element 29 or 33 to form laterally supported compliant arrays 18, 19. The details of the assembly of the bellows elements 29 or 33 may be that as suggested by the fragmentary cross-sectional views of FIGS. 6 and 7. The vertical spacing between layers of ring 36 arrays depends upon the bellows design and expansion/compression characteristics.

The open ends of bellows elements 29, 33 adjacent respective platens 20, 21 may be sealed to reinforced rubber sheets (not shown) which contact the surfaces of platens 20, 21. The joint configuration and joining techniques for these sheets may be similar to that used for joining element 29 to sheet 30 and element 33 to sheet 34, as shown in FIGS. 6 and 7.

In the construction of a system according to the invention herein, the stabilization rings 36, bellows elements 29, 33, and other parts may be sized and configured to provide individual bellows elements of about a 12-inch square cross section. The number of elements required to complete a desired array 18 or 19 depends, of course, on the wing 11 surface area and dimensions.

For certain portions of wing 11 where the pressure envelopes 13, 15 (see FIGS. 1 and 2) characteristic of the aerodynamic loading thereon exhibit rapid change, e.g., at the portions of wing 11 corresponding to increments 16a and 17a of FIG. 2, it may be desirable to more closely approximate the pressure envelope by using additional (smaller) bellows. This may be accomplished by using the stabilization configuration suggested in FIG. 11. As shown therein, one or more stabilization rings 36 may be replaced by four smaller rings 39 arranged and interconnected using connectors 38 substantially as shown. Corresponding stabilization rings 36 in adjacent layers of ring 36 arrays would be similarly replaced to accommodate smaller sized bellows elements 29, 33, for example, of about five inches square. In order to more closely approximate the pressure distribution over the surface of wing 11, it may be desirable to provide a row of ring 39 sets extending across the entire leading edge 11a of wing 11 in either or both of the arrays 18, 19. Each smaller individual bellows element could, of course, be individually pressure controlled in a manner substantially identical to that for the larger size bellows elements.

Figure 12:
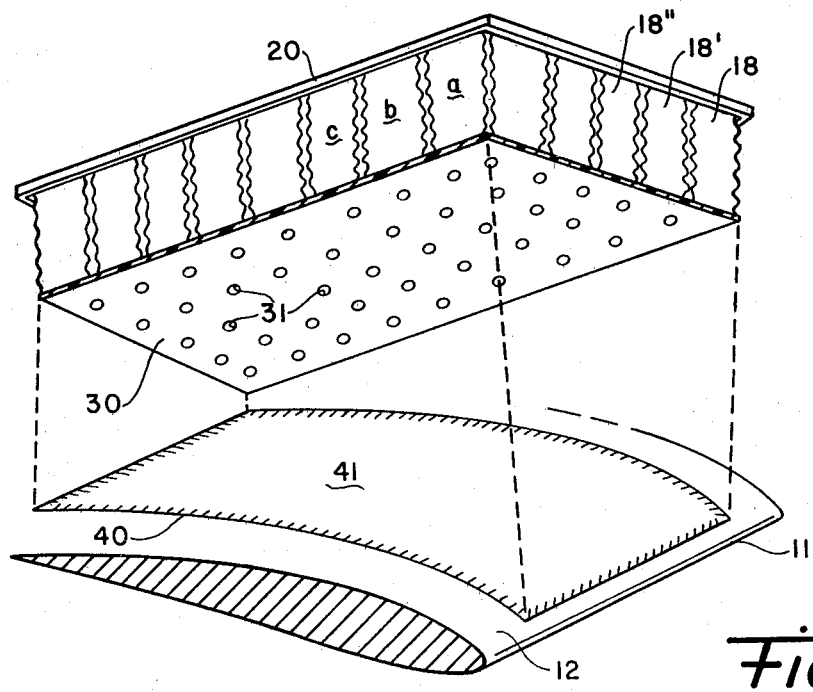
FIG. 12 illustrates a means for effecting adherence of the bellows array to a wing surface.

In an effort to obtain the desirable partial vacuum-induced adherence of bellows array 18 to the upper surfce 12 of wing 11, it may be desirable to include additional means to ensure positive adhesion of rubber sheet 30 to the surface 12 of wing 11. This may be accomplished in one variation of use of the invention as exemplified in the fragmentary view of FIG. 12. A layer of adhesive or tape or sheet 40 having adhesive on both upper and lower surfaces thereof may first be applied to surface 12 of wing 11, to expose an adhesive coated surface 41 for positive adherence to the corresponding (lower) surface of reinforced rubber sheet 30, in a manner substantially as shown in FIG. 12. In this application it may be desirable to use a nonsetting adhesive. A wide range of adhesives or tapes commercially available may be utilized in this application.

Control of the pressures to be maintained in each individual bellows of the arrays simulating the aerodynamic loading over substantially the entire upper and lower surfaces 12, 14 of wing 11 may best be accomplished using computerization. Data defining the pressure distribution curves 13, 15 at a plurality of increments along the length of wing 11 from root to tip for the particular aircraft being tested, and the data defining the matrix array pattern of bellows arrays 18, 19 covering the upper surface 12 and lower surface 14 of wing 11 are fed into the computer. The computer calculates the average pressure or partial pressure (i.e., incremental values analogous to increments 16 $a$–$l$, 17 $a$–$l$ of FIG. 2) from the pressure distribution curves for each individual bellows correlated with its size and location on wing 11. Appropriate pressures may then be distributed over the upper and lower surfaces 12, 14 of wing 11 in any desired manner, such as a percentage of maximum design values. The airfoil being tested may additionally be instrumented with strain gages and the like (not shown in the drawings), prior to simulated aerodynamic loading, to measure shear, bending moment and torsion loading experienced by the airfoil. For such measurements, normally involving large wing tip deflections, the controllably movable test support structure (i.e., elements 23, 24, 25 and 27 of FIG. 5) may be employed, and the computer calculations controlling pressure inputs to the bellows matrix arrays 18, 19 may be continuously revised to take into account the bending, shear and torsion loading values derived from the test.

The present invention, as hereinabove described in any of its contemplated variations, therefore provides a new and improved simulated aerodynamic loading system for structural testing of airfoils or the like. It is clear that the novel stabilization system described provides the needed lateral support for the bellows elements without sacrificing the flexibility of the assembled system to conform to contoured surfaces. The movable structure eliminates the need for larger capacity extensible bellows. Other applications of the novel bellows array described are therefore suggested as would occur to one with skill in the field of this invention.

It is understood that certain modifications to the invention as described may be made within the intended scope hereof. Therefore, all embodiments contemplated hereunder have not been shown in complete detail. Other embodiments may be developed without departing from the spirit of this invention or from the scope of the appended claims.

I claim:

1. An apparatus for simulating the aerodynamic load distribution over the surfaces of an airfoil, comprising:
   a. upper and lower backing platens supported in a substantially parallel spaced relationship with said airfoil juxtaposed therebetween;
   b. means defining a first array of a plurality of individual longitudinally expansible volume elements disposed between confronting surfaces of said upper platen and said airfoil;
   c. means defining a second array of a plurality of individual longitudinally expansible volume elements disposed between confronting surfaces of said lower platen and said airfoil; and
   d. means for controlling the pressure within each said expansible volume element.

2. The apparatus as recited in claim 1 wherein said platens are fixed against relative movement therebetween.

3. The apparatus as recited in claim 2 further comprising means for moving said platens in a direction substantially perpendicular to said platens.

4. The apparatus as recited in claim 3 wherein said moving means comprises hydraulically actuated rams operatively interconnected to said platens.

5. The apparatus as recited in claim 1 wherein said platens are substantially coextensive with the surface area presented by said airfoil.

6. The apparatus as recited in claim 1 wherein said means defining said first and second arrays comprises a plurality of adjacent, closely spaced tubular bellows elements.

7. The apparatus as recited in claim 6 further comprising a first flexible sheet adjacent said airfoil to which one end of each bellows element in the adjacent array is sealably attached.

8. The apparatus as recited in claim 7 further comprising a layer of adhesive between confronting surfaces of said airfoil and said first flexible sheet.

9. The apparatus as recited in claim 7 further comprising a second flexible sheet to which each opposite end of each bellows element is sealably attached.

10. The apparatus as recited in claim 9 further comprising a source of pressure and means defining passageways through each of said platens and adjacent flexible sheets through which each of said bellows elements communicates with said source of pressure.

11. The apparatus as recited in claim 1 wherein said pressure control means includes a source of pneumatic pressure.

12. The apparatus as recited in claim 1 wherein said pressure control means includes a source of hydraulic pressure.

13. An apparatus for simulating the aerodynamic load distribution over the surfaces of an airfoil, comprising:
   a. upper and lower backing platens supported in a substantially parallel spaced relationship with said airfoil juxtaposed therebetween;
   b. first and second bellows assemblies, each of said assemblies comprising a plurality of adjacent, closely spaced, longitudinally extensible tubular bellows elements and a pair of flexible sheets with said bellows elements sealably disposed therebetween to form a compliant array;
   c. said first assembly disposed beween confronting surfaces of said upper platen and said airfoil, and said second assembly disposed between confronting surfaces of said lower platen and said airfoil;
   d. a source of pneumatic pressure;
   e. valve means interconnecting said bellows elements in one of said assemblies with said pressure source for selectively controlling the pressure within each said bellows element of said one assembly;
   f. a source of reduced pressure; and
   g. valve means interconnecting said bellows elements in the other said assembly with said reduced pressure source for selectively maintaining a partial vacuum within each said bellows element of said other assembly.

14. The apparatus as recited in claim 13 wherein each of said bellows elements and flexible sheets comprises reinforced rubber.

15. The apparatus as recited in claim 13 or claim 14 further comprising a plurality of rigid rings, a said ring surrounding each of said bellows elements and hingedly interconnected to each adjacent ring to form a compliant array of said rings for laterally supporting said bellows elements.

16. The apparatus as recited in claim 13 wherein each of said bellows assemblies substantially coextensive with its respective adjacent airfoil surface.

17. An apparatus for simulating the aerodynamic load distribution over the surfaces of an airfoil, comprising:
   a. upper and lower backing platens supported in a substantially parallel spaced relationship with said airfoil juxtaposed therebetween;
   b. means defining a first array of longitudinally expansible volume elements disposed between confronting surfaces of said upper platen and said airfoil;
   c. means defining a second array of longitudinally expansible volume elements disposed between confronting surfaces of said lower platen and said airfoil; and
   d. pressure control means for selectively evacuating each of said expansible volume elements comprising one of said arrays, and for selectively applying pressure to each of said expansible volume elements comprising the other said array.

18. The apparatus as recited in claim 17 wherein said platens are fixed against relative movement therebetween.

19. The apparatus as recited in claim 18 further comprising means for moving said platens in a direction substantially perpendicular to said platens.

20. The apparatus as recited in claim 19 wherein said moving means comprises hydraulically actuated rams operatively interconnected to said platens.

21. The apparatus as recited in claim 17 wherein said platens are substantially coextensive with the surface area presented by said airfoil.

22. The apparatus as recited in claim 17 wherein said means defining said first and second arrays comprise a plurality of adjacent, closely spaced tubular bellows elements.

23. The apparatus as recited in claim 22 further comprising a first flexible sheet adjacent said airfoil to which one end of each bellows element in the adjacent array is sealably attached.

24. The apparatus as recited in claim 23 further comprising a layer of adhesive between confronting surfaces of said airfoil and said first flexible sheet.

25. The apparatus as recited in claim 23 further comprising a second flexible sheet to which each opposite end of each bellows element is sealably attached.

26. The apparatus as recited in claim 25 further comprising a source of pressure and means defining passageways through each of said platens and adjacent flexible sheets through which each of said bellows elements communicates with said source of pressure.

27. The apparatus as recited in claim 17 wherein said pressure control means includes a source of pneumatic pressure.

28. The apparatus as recited in claim 17 wherein said pressure control means includes a source of hydraulic pressure.

* * * * *